AUTOMATIC ELECTRONIC FREQUENCY CONTROL

Filed June 12, 1964 5 Sheets-Sheet 1

INVENTOR.
EUGENE F. LAPORTE
BY Roy M. Pitts
ATTORNEY

AUTOMATIC ELECTRONIC FREQUENCY CONTROL

Filed June 12, 1964 5 Sheets-Sheet 2

INVENTOR.
EUGENE F. LAPORTE
BY Rolf M. Pitts
ATTORNEY

July 19, 1966 E. F. LAPORTE 3,262,114

AUTOMATIC ELECTRONIC FREQUENCY CONTROL

Filed June 12, 1964 5 Sheets-Sheet 3

INVENTOR
EUGENE F. LAPORTE

BY [signature]

ATTORNEY

AUTOMATIC ELECTRONIC FREQUENCY CONTROL

Filed June 12, 1964 5 Sheets-Sheet 4

INVENTOR
EUGENE F. LAPORTE
BY Roy M. Ritts
ATTORNEY

July 19, 1966 E. F. LAPORTE 3,262,114

AUTOMATIC ELECTRONIC FREQUENCY CONTROL

Filed June 12, 1964 5 Sheets-Sheet 5

INVENTOR.
EUGENE F. LAPORTE

BY

ATTORNEY

United States Patent Office 3,262,114
Patented July 19, 1966

3,262,114
AUTOMATIC ELECTRONIC FREQUENCY CONTROL

Eugene F. Laporte, Chino, Calif., assignor to North American Aviation, Inc.
Filed June 12, 1964, Ser. No. 374,728
16 Claims. (Cl. 343—17.1)

The subject invention relates to automatic electronic frequency control devices, and more particularly to an improved non-sweeping difference-frequency controller adapted for use in a pulsed radar system.

In the construction and arrangement of coherent energy radar receivers, the received reflection of transmitted microwave energy is required to be distinguished from microwave noise energy and amplified to useful energy levels, Such combined function is performed by the cooperation of a local oscillator and microwave mixer with a highly-tuned intermediate-frequency amplifier (called an IF strip), the local oscillator and mixer reducing the frequency of the received energy to an intermediate frequency corresponding to the tuned frequency of the IF strip, as is well understood in the art. In such arrangement the frequency of the local oscillator is preferably made to correspond to a frequency fixed relative to the radar transmitter frequency and differing therefrom by an amount corresponding to the IF frequency of the tuned IF strip.

Such correspondence of the local oscillator frequency requires a frequency discriminator operating in an automatic electronic frequency control loop for adjusting the frequency of either or both of the receiver local oscillator and transmitter-oscillator as functions of the difference between the resultant IF frequency output of the mixer and a selected IF reference (corresponding to the tuned frequency of the IF amplifier strip).

In the prior art of automatic frequency control units (AFC units) for radar system application, a swept-frequency (or search) mode is employed in which a ramp-function control voltage is applied to the receiver local oscillator, causing the local oscillator to behave as a swept-frequency generator in which mode the local oscillator output frequency is progressively varied from a frequency below the selected frequency of interest to a frequency higher than the selected frequency of interest, whereby the resultant IF frequency is made to correspondingly vary. When the difference between the IF frequency and the selected or reference frequency is zero, then a lock-on or frequency-tracking mode occurs, in which an analog signal is used to control the local oscillator to a frequency differing from the received signal by the amount of the selected IF frequency.

Such prior-art dual-mode AFC unit comprises a narrow-band frequency discriminator, pulse stretcher and phantastron in closed-loop cooperation with the frequency mixer and local oscillator of the receiver, as is described more fully for example in U.S. patent application, Serial No. 261,980, filed March 1, 1963, by James A. Moulton, assignor to North American Aviation, Inc., assignee of the subject invention.

The swept-frequency feature provided by the phantastron is normally required because of the extremely narrow-bandwidth response of the discriminator, no control function being effected by the discriminator when the system performance drifts outside such bandwidth. However, a disadvantage of such prior art combination is that when the difference between the local oscillator frequency and the received signal frequency is too great (due, for example, to the radar transmitter "missing" a pulse), the phantastron may revert from the analog signal mode (during which "frequency-tracking" occurs in the AFC) to the voltage scanning mode (whereby frequency scanning occurs in the AFC). Also, during such scanning mode, frequency lock-on may occur at a frequency representing a sub-harmonic of the reference IF frequency, due to harmonics generated in the system mixers. Further, lock-on may occur at a "mirror-frequency" (a local oscillator frequency which produces the IF frequency of interest but causes a corresponding sense-reversal of the control action of the AFC unit, which consequently results in initiating the frequency scanning mode again).

Such deficiencies in prior art phantastron-type AFC units may be partially corrected by the addition of ancillary control equipment, as disclosed in the said U.S. patent application, Serial No. 261,980, filed March 1, 1963, by James A. Moulton. However, the resulting equipment package is of increased weight, space, cost and complexity. Further, such ancillary logic control means is prone to be undesirably responsive to power supply transients common to airborne power systems.

Additionally, due to the unipolar sensitivity of the phantastron circuit for effecting the lock-on or frequency-tracking function, the frequency control operating point of the closed loop AFC unit must be undesirably offset from the frequency discriminator null point. Such offset will correspondingly vary with a change in the system gain; and therefore any variation or drift in the gain of the system will produce a shift in the resulting IF frequency.

According to the concept of the subject invention, simplified automatic frequency control means is provided for achieving the improved performance sought by ancillary control of the phantastron sweep device, but without the necessity of a phantastron circuit and the associated complexity of such ancillary control equipment and without suffering the swept-frequency mode provided by the phantastron device.

In a preferred embodiment of the subject invention, there is provided automatic frequency control means comprising an improved frequency discriminator having an input, output and common input-output terminals and including an L-C bridge network responsively coupled to the input and output terminals; and having two bridge-output terminals. There is further provided signal summing means comprising a first and second oppositely-poled unidirectionally conductive summing impedance branch, each having a first terminal commonly connected to the output terminal of the frequency discriminator and a second terminal connected to a mutually exclusive one of the bridge output terminals.

In normal operation of the above-described arrangement, an output signal is provided, the polarity of which is indicative of the sense of the frequency difference between a reference frequency and the frequency of an input signal applied to the input terminal over an extremely wide band of frequencies, as to make a swept frequency mode unnecessary. The amplitude ratio of the output signal to the input signal varies linearly about a null at a center frequency within a narrow bandwidth which includes the reference frequency at the center frequency thereof, the amplitude ratio tending to approach a limit (other than a null) for input frequencies outside such bandwidth. In this way the response of the device to harmonics and sub-harmonics is suppressed. Such output signal may be applied in closed loop fashion for the control of at least one of a receiver local oscillator and transmitter of a radar system or other device relying upon voltage-control means for providing a source of regulated frequency. Accordingly, it is an object of the subject invention to provide improved frequency-discriminator means for use in an automatic electronic frequency control unit.

It is another object of the subject invention to provide non-sweeping automatic electronic frequency control means of improved performance for radar systems applications.

It is still another object of the subject invention to provide improved frequency-control means exclusive of a phantastron sweep circuit.

It is yet another object of the invention to provide simplified and improved frequency control means not subject to frequency-tracking of either image frequencies or harmonics of a selected reference frequency.

It is a further object of the invention to provide improved performance and reduced complexity in automatic electronic frequency control apparatus for pulsed energy systems.

These and other objects of the subject invention will become apparent from the following description taken together with the accompanying drawings in which.

Figure 2:
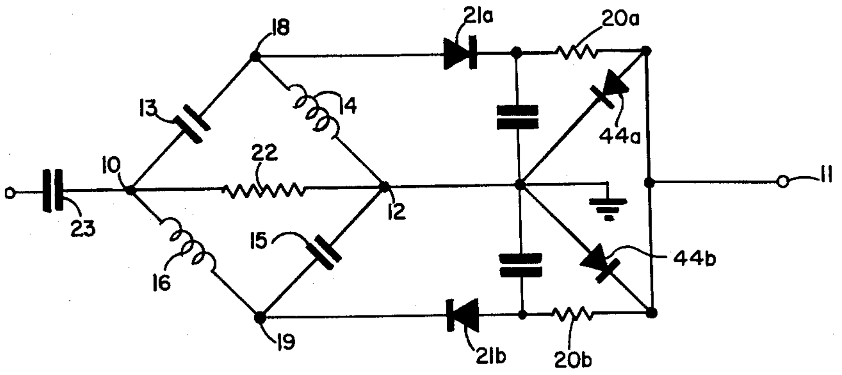
FIG. 2 is a schematic diagram of a concept of the invention.
Figure 3A:
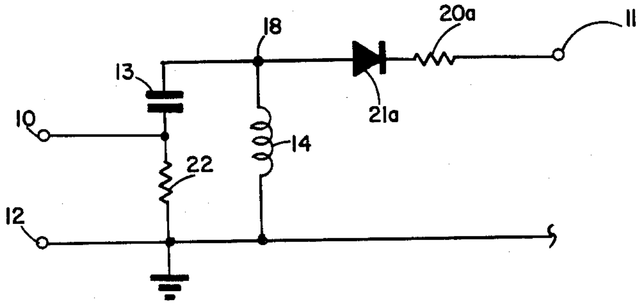
Figure 3B:
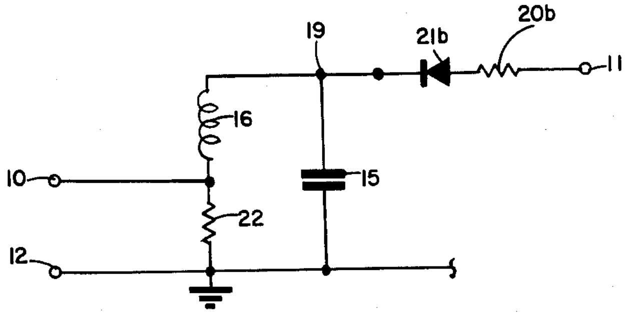

FIG. 3*a* and 3*b* are alternate schematic diagrams of complementary portions of the frequency discriminator of FIG. 2.

Figure 4:
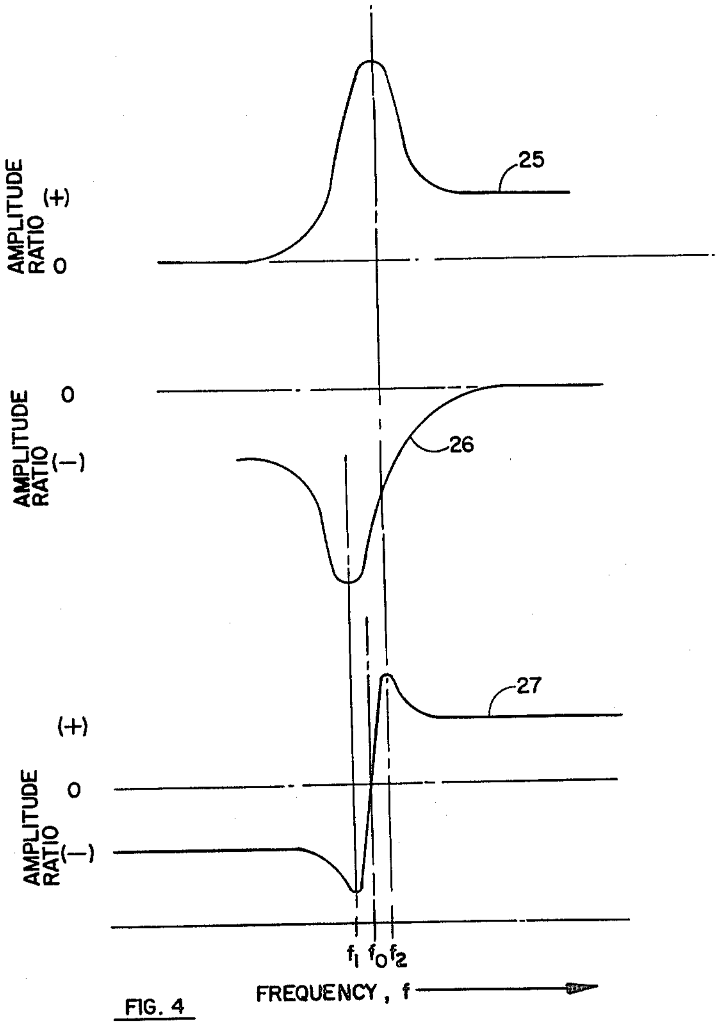

FIG. 4 is a family of frequency response curves illustrating the response characteristics of the frequency discriminator of FIG. 2.

Figure 5:
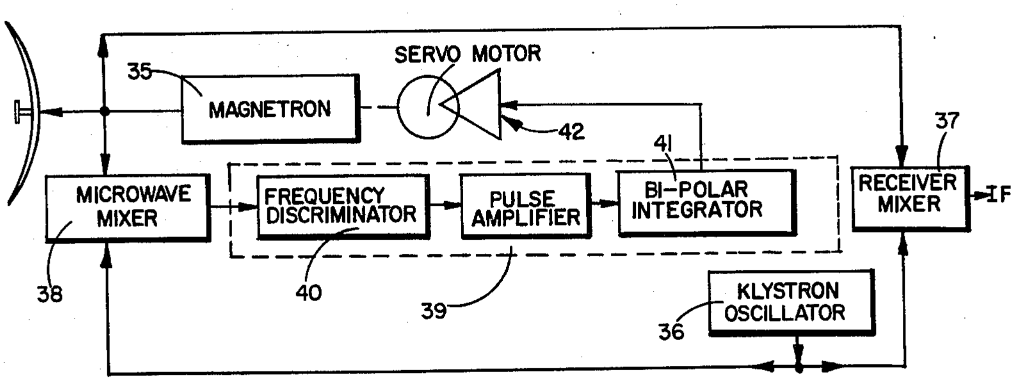
Figure 6:
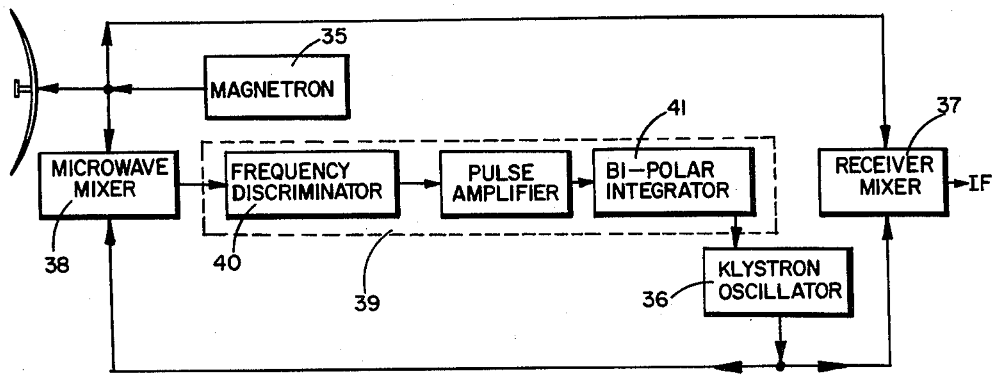

FIGS. 5 and 6 are block diagrams of radar systems employing the concept of the invention.

Figure 7:
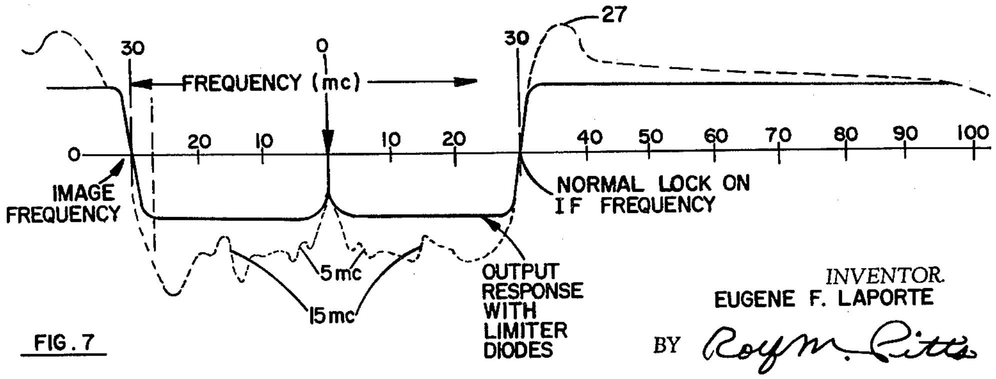
Figure 8:
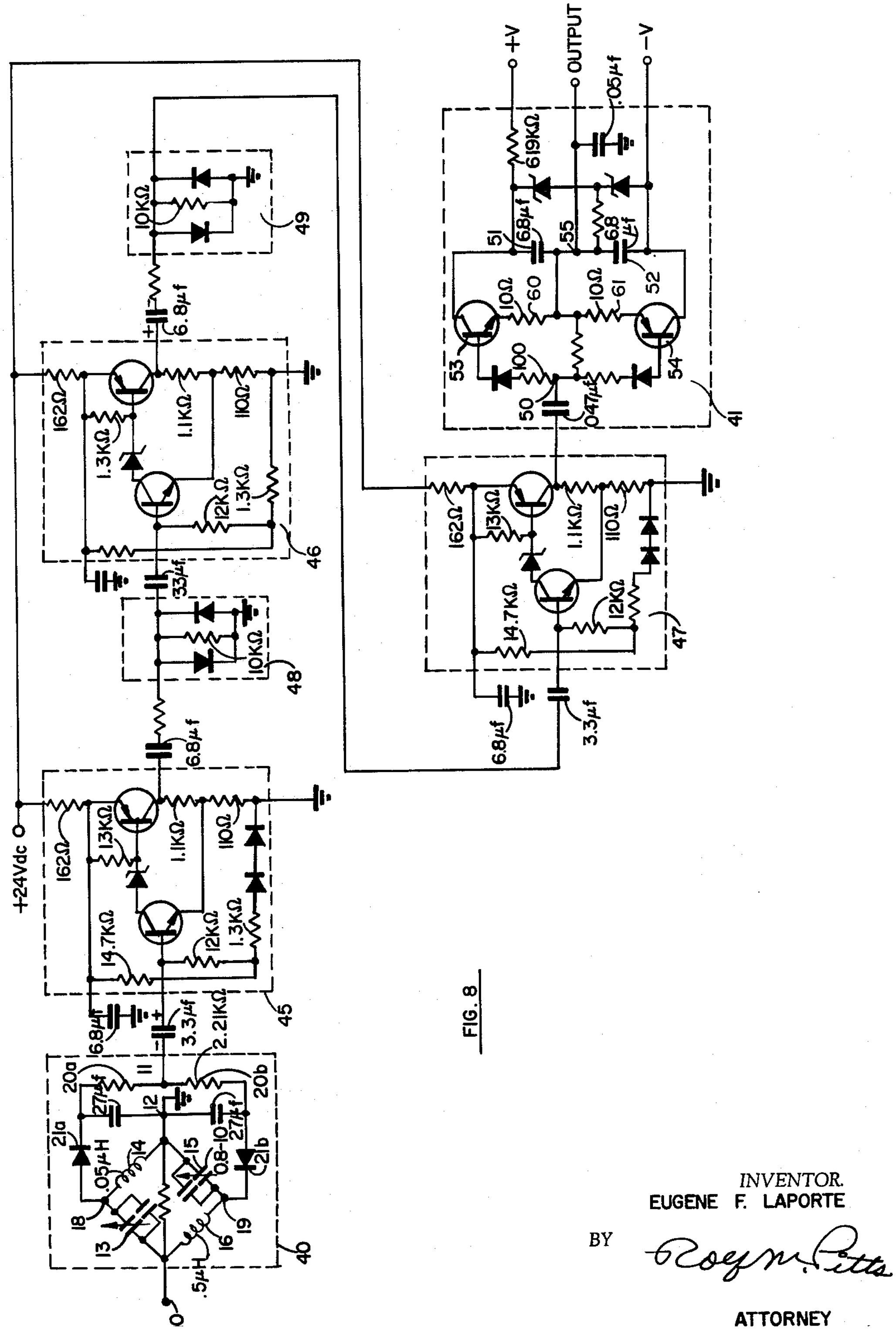

FIG. 7 is a family of curves illustrating the frequency response of the devices of FIGS. 5 and 6, and FIG. 8 is a schematic diagram illustrating a preferred embodiment of the inventive device employed in the systems of FIGS. 5 and 6.

In the figures, like reference characters refer to like parts.

In the prior art of automatic frequency control of IF radar receivers, frequency discriminators have been employed which rely upon symmetrical arrangements of a pair of high "Q" resonant circuits or narrow bandpass filters, the tuning frequency ($f_1$ and $f_2$) of each component circuit being staggered or differing slightly from the other, being above and below a center-frequency ($f_0$) corresponding to the reference frequency of interest. The several detection arrangements for the two component resonant circuit elements provide responses corresponding to curves 30 and 31 of FIG. 1.

It is to be noted that the skirts of such response curves (corresponding to the response outside the bandwidth of the prior-art narrow-bandpass filters described) tend to be mirror images of each other. The combined response of such discriminator arrangement is indicated by the sum of curves 30 and 31, as shown by curve 32, which shows a bi-polar response including a linear response region within a narrow bandwidth for which the reference frequency ($f_0$) is the center frequency, the skirt or response outside such bandwidth tending toward a null.

Figure 1:
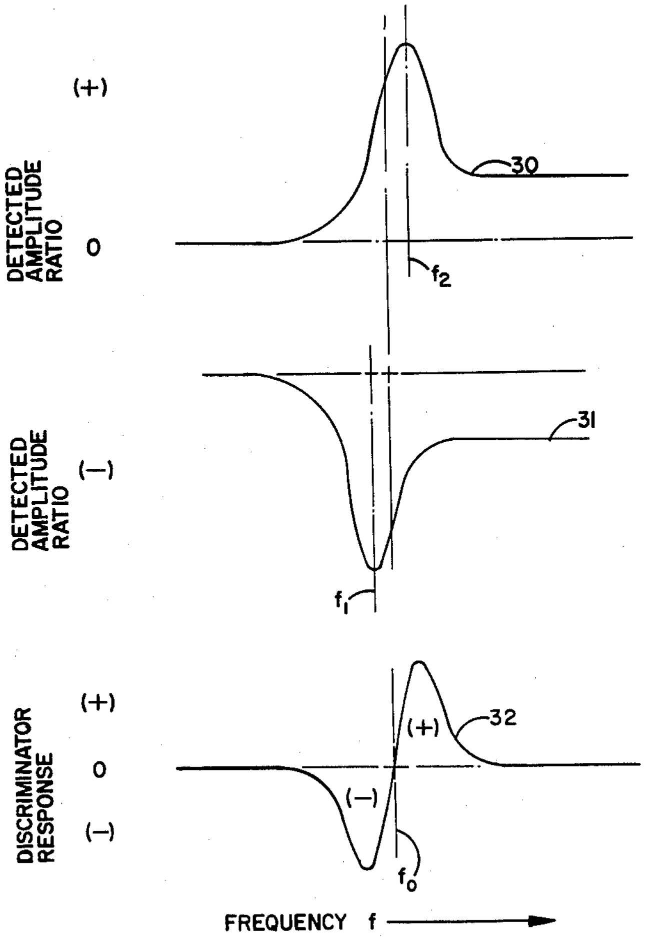
FIG. 1 is a family of frequency response curves illustrating typical response characteristics of prior-art frequency-discriminators.

Typical discriminator devices demonstrating such response characteristics are described, for example, in chapter 3 of "Microwave Receivers," volume 23 of the Radiation Laboratory Series, published by McGraw-Hill (1948), exemplary circuits being illustrated in FIGS. 3.3, 3.11, 3.12, and 3.13 thereof, the response characteristics of which being illustrated at FIG. 3.2 thereof (corresponding to curve 32 of FIG. 1 above).

Because of the limited frequency region of "pull-in" or affirmative control provided by an AEFC unit employing such prior-art discriminators, frequency-sweeping means must be included when the frequency difference between the radar receiver IF frequency and the tuned frequency of the receiver equipment exceeds such bandwidth due to drift of either or both the radar transmitter and the receiver local oscillator. A possible result of such frequency-sweeping function is that consequent lock-on and frequency-tracking may occur at a mirror-frequency or a harmonic response of the system response, as described more fully in the above mentioned U.S. patent application, Serial No. 261,980, filed March 1, 1963, by James A. Moulton.

The subject invention avoids the necessity of prior art swept frequency mode devices by means of a frequency discriminator having an upper and lower "skirt" or frequency response other than a null response, whereby control may be effected in response to frequency drifts larger than the representative response bandwidth shown in FIG. 1 for a prior-art discriminator. Such alternate discriminator is shown in FIG. 2.

Referring now to FIG. 2, there is illustrated a circuit diagram of one concept of the invention, namely frequency discriminator means having an input terminal 10, output terminal 11, and common input-output terminal 12. There is provided an L-C bridge having a first L-C network comprising a first capacitive element 13 and a first inductive element 14, and a second L-C network comprising a second capacitor 15 and a second inductor 16. Each of the two L-C networks is connected across input and common terminals 10 and 12, capacitive element 13 of the first L-C network and inductive element 16 of the second L-C network being commonly connected to input terminal 10. A shunt resistor 22 is also connected across terminals 10 and 12. There is also provided signal summing means 17 operatively connected to output terminal 11 and responsively connected to the interconnection 18 of first capacitor 13 and first inductor 14 and further connected to the interconnection 19 of second capacitor 15 and second inductor 16.

Summing means 17 is comprised of a first and second unidirectionally-conductive summing impedances each having a first terminal commonly connected to output terminal 11, and a second terminal connected to a mutually exclusive one of terminals 18 and 19, the unidirectional impedances being oppositely poled. Such unidirectionally-conductive summing impedances are each comprised of a summing resistor 20 in series with a diode 21, the diodes **21*a* and 21*b*** being oppositely poled.

Operation of the arrangement of FIG. 2 as a frequency discriminator may be more easily appreciated by aid of FIGS. 3*a*, 3*b*, and 4.

Referring to FIGS. 3*a* and 3*b*, there are illustrated alternate representations of each of the two L-C networks of FIG. 2. FIG. 3*a* is an alternate schematic representation of capacitor 13 and inductor 14 of the first L-C network represented as a parallel tank circuit connected across intermediate terminal 18 and common terminal 12, resistor 22 being connected in series with capacitor 13 and the unidirectionally conductive impedance branch (e.g., series-connected diode **21*a* and summing resistor 20*a*) interconnecting intermediate terminal 18 and output terminal 11. It is to be appreciated that, in response to inputs applied across shunt resistor 22**, the amplitude ratio of the output potential developed across the tank of FIG. 3*a* as a function of frequency will be a maximum for inputs of the tank resonant frequency $f_2$ and will tend toward zero at frequencies considerably below the resonant frequency $f_2$, due to the blocking action of capacitor 13 (coupled with the shunting effect of inductor 14). At frequencies considerably above the resonant frequency (e.g., outside the bandwidth defined by the "Q" of the tank), the high-frequency shorting action of capacitor 13 essentially interconnects terminals 10 and 18, whereby the potential across terminals 18 and 12 is substantially the input potential applied across terminals 10 and 12. Resistor 22 provides a source impedance to ground (terminal 12) for the D.-C. potential developed by the cooperation of diode **21*a*** with the tank circuit of FIG. 3*a*. Hence, the amplitude ratio of the unipolar output across terminals 11 and 12, resulting from the high-frequency ($f >> f_2$) response of the tank circuit of FIG. 3*a*, will be a finite value (other than zero).

FIG. $3b$ is an alternate schematic representation of capacitor 15 and inductor 16 of the second L-C network of FIG. 2, represented as a parallel tank circuit connected across intermediate terminal 19 and common terminal 12, resistor 22 being connected in series with inductor 16 and the unidirectionally conductive impedance branch (e.g., series-connected elements 20*b* and 21*b*) interconnecting intermediate terminal 19 and output terminal 11. It is to be appreciated that, in response to inputs applied across shunt resistor 22, the amplitude ratio of the tank of FIG. $3b$, as a function of frequency, will tend toward zero at frequencies considerably above the tank resonant frequency $f_2$, due to the attenuation or blocking action of inductor 16 (coupled with the shunting effect of capacitor 15). At frequencies considerably below the tank resonant frequency, $f_1$ (e.g., outside the bandwidth defined by the Q of the tank), the low frequency shorting action of inductor 16 essentially interconnects terminals 10 and 19 whereby the potential across terminals 19 and 12 is substantially the input potential applied across terminals 10 and 12. Resistor 22 provides a source impedance to ground (terminal 12) for the unipolar potential developed by the cooperation of diode 21*b* with the tank circuit of FIG. $3b$. Hence the amplitude ratio of the unipolar output across terminals 11 and 12 resulting from the low-frequency ($f<<f_1$) response of the tank circuit of FIG. $3b$ will be a finite value other than zero.

In a preferred arrangement, of course, the tuned tanks of FIGS. $3a$ and $3b$ are stagger-tuned whereby the tuned frequency of each lies within the bandwidth of the other of the two tanks, the tuned frequency ($f_1$) of the low-pass network being below that ($f_2$) of the high-pass network ($f_1<f_2$).

The several responses of the various circuit elements of FIG. 2 (severally represented in FIGS. $3a$ and $3b$) are shown in FIG. 4.

Referring to FIG. 4, there is illustrated a family of frequency response curves illustrating the response of certain elements of the device of FIG. 1. Curve 25 illustrates the relative amplitude of a potential developed on summing resistor 20*a* (as a function of frequency) in response to an A.-C. input applied at terminal 10 (of FIG. 1), the positive sense of the curve indicating the clipping action of diode 21*a* upon the A.-C. signal. Curve 26 illustrates the relative amplitude of a potential developed on summing resistor 20*b* (as a function of frequency) in response to the A.-C. input applied to terminal 10 (of FIG. 1), the negative sense of the curve indicating the clipping action of diode 21*b* upon an A.-C. signal. Curve 27 illustrates the output potential appearing on output terminal 11 resulting from the combination of the two signals of mutually opposite sense, represented by curves 25 and 26.

As the frequency of a fixed-amplitude input (applied to input terminal 10 of FIG. 1) is increased, the impedance drop across second inductor 16 increases, and the shunt impedance of second capacitor 15 increases (tending to short-out terminal 19), whereby the negative potential provided by the cooperation of second summing resistor 20*b* and summing diode 21*b* decreases toward zero as the frequency increases (curve 26 of FIG. 4). Similarly, the impedance drop across first (shunt) inductor 14 increases and the impedance drop across first (series) capacitor 13 decreases, whereby the positive potential provided by the cooperation of first summing resistor 20*a* and first summing diode 21*a* with terminal 18 tends to increase with frequency (curve 25 in FIG. 4). Hence, it is to be appreciated that the second L-C network (e.g., elements 15 and 16) of FIG. 2 acts as a low-pass network; and that the first L-C network (e.g., elements 13 and 14) acts as a high pass network.

Due to the stagger-tuning of the two tanks above and below, respectively, a reference or control frequency of interest $f_0$ (e.g., $f_1<f_0<f_2$), the oppositely-poled detection and summation impedances of summing means 17 (in FIG. 1) cooperate with the low-pass and high-pass L-C networks to provide a detected output signal (at terminal 11 in FIG. 2) having a sense indicative of the sense of the difference between the reference frequency and the frequency of the input signal (curve 27 in FIG. 4) over an extremely wide bandwidth, while the amplitude of the detected output signal is further indicative of the amplitude of the frequency difference within an extremely narrow bandwidth. In other words, the high and low frequency skirts of the response curve 27 of FIG. 4 have finite values other than zero, and a respective sense corresponding to the sensing the frequency difference between the input signal and the reference or crossover frequency ($f_0$) of the discriminator of FIG. 2.

Because of the finite skirt response (extremities of curve 27 in FIG. 4), the discriminator of FIG. 2 may be employed in a radar difference frequency, or IF frequency, controller without the necessity of a frequency scanning mode, the discriminator being capable of providing a control signal over at least as wide a range of frequencies as a radar system could reasonably be expected to wander. Also, the skirt response provides a bias to system harmonics, thereby tending to suppress AEFC system response to such harmonics, as will be more fully explained in connection with FIGS. 5 and 6, which are block diagrams of systems employing the concept of the invention.

Referring to FIG. 5 there is illustrated a block diagram of a pulsed energy radar system employing the concept of the invention. There is provided an adjustable magnetron 35 or like voltage controlled means for transmitting pulsed A.-C. (radar) energy, a local oscillator 36, an intermediate frequency receiver 37 response to local oscillator 36 and received reflections of the transmitted energy, and a microwave mixer 38 response to both the pulsed transmitter energy and the output of local oscillator 36 for providing an intermediate frequency signal (corresponding to that employed by receiver 37), all constructed and arranged by means well-known in the art.

There is further provided an automatic electronic frequency control (AEFC) unit 39 responsively coupled to mixer 38 for providing an error signal indicative of the frequency difference between the IF output of mixer 38 and a selected reference frequency.

AEFC unit 39 is comprised of a frequency discriminator 40 (corresponding to the device of FIG. 2) A.-C. coupled to mixer 39, and a bipolar pulse integrator 41 responsively coupled to discriminator 40 for providing a hold-circuit function (from pulse-to-pulse of the transmitter operation) and to also provide a control signal indicative of the time integral of the error signal input thereto. Such control signal is then fed to a servo 42 or other means for controlling the frequency of transmitter 35.

Broadband IF amplifiers may be included in AEFC unit 39 for improving signal levels and providing impedance matching as required, as is well understood in the art.

In normal operation of the arrangement of FIG. 5, the control signal output from AEFC unit 39 causes servo 42 to drive the frequency of magnetron 35 in such a sense that the frequency difference between the inputs to mixer 38 (as manifested by the IF output of mixer 38) tends to correspond to the reference frequency of discriminator 40. Any error in such frequency (as manifested by the output of discriminator 40) is integrated by pulse-integrator 41 to provide a control signal, the system response to which tends to drive the discriminator output to zero (indicating no error in the resultant IF frequency).

Alternatively, AEFC unit 39 of FIG. 5 may be employed to control the local oscillator (rather than the magnetron), as shown in FIG. 6.

Referring to FIG. 6, there is illustrated a block diagram of an alternate embodiment of a radar system employing the concept of the invention. There is provided magnetron 35, local oscillator 36, IF receiver 37, mixer 38, all constructed and arranged to cooperate similarly as like referenced elements in FIG. 5, except that local oscillator 36 is a voltage-controlled oscillator such as a klystron or the like. There is further provided an AEFC unit 39 responsively coupled to mixer 38, the output of AEFC unit 39 being operatively coupled to the control input of voltage-controlled oscillator 36.

The analog output of AEFC unit 39 (in response to the frequency of the input thereto from mixer 38) drives the frequency of the local oscillator output in such a sense that the frequency difference between the inputs to mixer 38 (as manifested by the IF output of mixer 38) tends to correspond to the reference frequency of discriminator 40. Such frequency correspondence is indicated by a null output from discriminator 40, as explained in connection with FIG. 5.

The output of mixer 38 is actually comprised of several components; a fundamental frequency corresponding to the frequency difference between the inputs to mixer 38, and at least a first harmonic of such fundamental. Therefore, it is possible to provide a component signal output from mixer 38 corresponding to the reference frequency of discriminator 40 in response to a frequency difference (in the inputs to mixer 38) of, say, one-half the reference frequency ($f_0$) of discriminator 40, as shown in FIG. 7.

Referring to FIG. 7, there is illustrated a frequency response diagram of a representative response of the AEFC unit of FIGS. 5 and 6, for an exemplary discriminator reference frequency of 30 megacycles per second. The null response at zero frequency indicates the effect of A.-C. (capacitive) input coupling of discriminator 40 (shown by coupling capacitors 23 in FIG. 2). The linear response of the discriminator about the selected reference frequency (30 mc.) is shown, a positive-sense skirt being obtained for frequencies above the reference frequency and a negative-sense skirt being obtained for frequencies below the selected reference frequency (corresponding to curve 27, of FIG. 4).

The crossover condition of curve 27 in FIG. 7 at the reference frequency to the right of zero may be produced by operating the local oscillator 36 of FIG. 6 at a frequency above or higher than that of the magnetron 35 by the amount, 30 megacycles per second. If the frequency of local oscillator 36 were then reduced to that of the magnetron, the resultant difference frequency would be zero, corresponding to the zero frequency of FIG. 7. If the local oscillator frequency were reduced still further to a frequency below that of the magnetron and differing from it by an amount corresponding to the reference frequency of discriminator 40, then the discriminator output would display the cross-over null shown at the left of zero frequency in FIG. 7. This second local oscillator frequency condition under which an IF or difference frequency corresponding to the reference IF frequency is called an image frequency, as is well known in the art. In such condition, the control sense of the AEFC control loop is reversed, preventing proper operation of the control loop at such frequency, as is well understood in the art, being explained at length, for example, in the above-cited U.S. patent application, Serial No. 261,980, filed March 1, 1963, by James A Moulton.

Where the frequency of local oscillator 36 is changed relative to magnetron 35 such that a frequency difference therebetween results which represents a sub-harmonic of the discriminator reference frequency ($f_0$), the harmonic content of the output of mixer 38 will contain such lesser difference frequency ($f$) and a harmonic thereof ($nf$, where $n$ is an integer) which harmonic is equal to the reference frequency ($f_0$) of the discriminator. In other words, $nf=f_0$. The magnitude of the component energy at such harmonic frequency ($nf=f_0$) is much less than that at the fundamental mixer frequency ($f$) as is well-known in the art.

For example, in the exemplary response curve 27 of FIG. 7, illustrated for discriminator 40 in cooperation with mixer 38 in the systems of FIGS. 5 and 6, and depicting a discriminator reference frequency ($f_0$) of 30 megacycles, a frequency difference of approximately 15 megacycles per second between the several inputs to mixer 38 results in a negative sense output from discriminator 40, as indicated by the displacement of curve 27 near 30 megacycles in FIG. 7. Further, the associated harmonic content of the mixer output will provide an additional component superimposed on the discriminator output and corresponding to the discriminator response to such higher frequency. Such additional component will be indicative of the frequency difference between the harmonic frequency ($nf$) and the discriminator reference frequency ($f_0$). The magnitude of such component response is, of course, much attenuated relative to the discriminator response to the fundamental frequency and corresponds to the lower energy level of such harmonic. Hence, the discriminator response (curve 27) in FIG. 7, in the region of 15 megacycles, for example, resembles (on a smaller scale) the cross-over region of 30 megacycles, biased however by the skirt or low frequency (15 mc.) response of the discriminator. In other words, the narrow bandwidth of the linear response of discriminator 40 to an attenuated harmonic output of mixer 38 (of FIGS. 5 and 6) is biased by the skirt response of the discriminator to the stronger low-frequency input of the fundamental frequency component. Such bias prevents system sense-reversals of the control signal in response to such harmonics, whereby the system is prevented from locking-onto or frequency-tracking a frequency ($f$) lower than the reference frequency ($f_0$) and representing a subharmonic thereof (e.g., $f=f_{0/n}$, when $n$ is an integer).

In order to limit the voltage range of inputs occurring at bi-polar integrator 41 in response to IF frequencies outside the narrow bandwidth of the discriminator linear response (cross-over) region, oppositely-poled diode limiters may be connected across the output of discriminator 40 as shown by the connection of diodes 44_a_ and 44_b_ in FIG. 2. Also, in this way the response of bi-polar integrator 41 is indicative of the time duration of a substantial error condition, rather than the time integral of the magnitude thereof. In other words, the stored signal provided by the bi-polar integrator is limited, though adequate for control purposes, and does not induce large subsequent system errors of an opposite sense in order to discharge the stored integrator signal resulting from a large initial system error.

In the steady-state condition, the integrator input is reduced to zero, with a corresponding zero change in the integrator stored signal. In other words, the stored remnant of the integrator output provides sufficient bias to the system (of FIGS. 5 and 6) for maintaining zero signal output from discriminator 40.

In the event of small transient frequency disturbances occurring within the narrow bandwidth of the linear response (cross-over) region of curve 27 (in FIG. 7), such linear response characteristic of the discriminator provides proportional control of bi-polar integrator 41 to rapidly reduce the system error to zero (e.g., obtain an IF output having a frequency corresponding to the reference frequency ($f_0$) of discriminator 40).

A preferred arrangement of the AEFC unit of FIGS. 5 and 6, including the arrangement of bi-polar integrator 41, is shown in detail in FIG. 8.

Referring to FIG. 8, there is illustrated a schematic diagram of a preferred embodiment for the automatic frequency control unit of FIGS. 5 and 6. There is provided a frequency discriminator 40 having an A.-C. coupled input and constructed and arranged substantially the same as the device of FIG. 2. There is also provided a first, second and third amplifier 45, 46 and 47 connected in tandem, the input of first amplifier 45 being coupled to the output of discriminator 40.

Bi-polar signal limiting is provided by first and second oppositely-poled diode pairs 48 and 49 connected across the outputs of first and second pulse amplifiers 45 and 46, respectively, and corresponding to the function of diodes 28*a* and 28*b* in FIG. 2.

The signal-limited output of third amplifier 47 is fed to an input terminal 50 of bi-polar integrator 41 for generating an output signal indicative of the time integral of the input thereto. Bi-polar integrator 41 is comprised of two series-interconnected capacitors 51 and 52 connected across a D.-C. supply, the interconnection terminal 55 forming an output terminal. Such supply may, for example, be a high voltage source for driving a klystron repeller. There is further provided two complementary (NPN and PNP) switching transistors 53 and 54 having control terminals commonly coupled to input terminal 50 and arranged for shorting or discharging a selected one of charged capacitors 51 and 52 corresponding to a preselected polarity of a pulsed input.

For example, a positive pulse applied to terminal 50 causes first switching transistor 53 to become conductive for the pulsed interval, whereby first capacitor 51 is partially discharged through resistor 60 (the charge on series second capacitor 52 being correspondingly increased). Such lesser positive potential drop across first capacitor 51 (i.e., between the positive terminal of the B supply voltage and output terminal 55) correspondingly shifts the potential of output terminal 55 in a positive sense. In other words, the output potential on terminal 50 incrementally steps in a positive direction in response to a positive pulse input applied to input terminal 50.

Similarly, when a negative pulse is applied to the input terminal 50 of bi-polar integrator 41, second switching transistor 54 becomes conductive during the interval of such pulse, thereby partially discharging second capacitor 52 through resistor 61 (the charge on series capacitor 51 being correspondingly increased), which shifts the potential of terminal 55 in a negative direction.

Hence, it is to be appreciated that bi-polar integrator 41 provides a D.-C. output voltage which is equal to the summation or time-integral of the pulse inputs applied thereto. Because such pulse inputs are indicative of the response of frequency-discriminator 40 to an IF input applied to discriminator input terminal 10, it is to be further appreciated that the stored signal on output terminal 55 (of integrator 41) is indicative of the time integral of the pulsed output from discriminator 40. Further, such stored signal continues to provide a signal reference, or to "remember" the system error, when no pulse input is provided due, for example, to the transmitter magnetron "missing" a pulse or omitting to "fire." Moreover, the large output shunt capacitance of integrator 41 serves to make the AEFC system 39 insensitive to normal system transients.

Bi-polar integrator 41 not only serves both a signal storage function (thereby eliminating the need for pulse stretching circuits commonly employed in the prior art) and a signal-integrating function (thereby reducing AEFC closed-loop steady-state performance errors toward zero), but also provides simple and effective circuits means for applying the low voltage outputs of a solid state frequency discriminator to the control of the high-potential repeller of a klystron oscillator, for example. In other words, bi-polar integrator 41 provides simple and effective means for resolving the high-voltage interface problem between low-potential solid-state AEFC units and a klystron oscillator.

The circuit parameter values shown in FIG. 8 are those which have been successfully employed and observed to satisfactorily cooperate with a pulsed radar system having a pulse width of one microsecond and utilizing an IF frequency of 60 megacycles.

Hence, it is to be appreciated that an improved automatic electronic frequency control unit has been described which does not employ a frequency sweeping mode, and which does not tend to lock-onto frequencies representing subharmonics or mirror images of a reference frequency of interest.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Frequency discriminator means having an input, output, and common input-output terminals, comprising An L-C bridge network responsively coupled to said input and common terminals and having two bridge network output terminals, and Signal summing means comprising a first and second unidirectionally-conductive summing impedance, each having a first terminal operatively connected to said output terminal of said discriminator means and a second terminal responsively coupled to a mutually exclusive one of said bridge network output terminals, said unidirectionally conductive imepdances being oppositely poled.

2. The device of claim 1 in which there is further provided amplitude-output signal limiting means comprising a first and second oppositely poled diode connected across said output and common input-output terminals of said discriminator, and a resistive impedance connected across said input and common input-output terminals of said discriminator means.

3. Frequency discriminator means having an input, output and common input-output terminals, comprising A shunt resistor connected across said input and common terminals;

A first and second L-C network, the capacitive element of said first network and the inductive element of said second network being commonly connected in series with said shunt resistor; and Summing means comprising a first and second oppositely-poled unidirectionally-conductive summing impedance branch coupling a respective one of said parallel L-C networks to said output terminal, The tuned frequency of said first L-C network being less than that of said second L-C network, said tuned frequencies commonly lying within the pass bands of both said L-C networks.

4. Frequency discriminator means having an input, output and common input-output terminal, comprising A low pass L-C network and A high pass L-C network, the inputs of said L-C networks being commonly coupled to said input terminal, said high pass and low pass L-C networks having a tuned frequency higher and lower, respectively, than a selected reference frequency commonly lying within the pass bands of said networks, and Signal summing means connected to said output terminal and responsive to the outputs of said networks for providing a combined output signal indicative of the sense of a frequency difference between an applied input signal and said selected frequency.

5. The device of claim 4 in which said signal summing means comprises a first and second unidirectionally conductive summing impedance, each having a first terminal operatively connected to said output terminal and a second terminal responsively coupled to an output of a mutually exclusive one of said L-C networks, said unidirectionally conductive impedances being oppositely poled, whereby the sense of the output signal on said output terminal is indicative of the sense of said frequency difference.

6. The device of claim 4 in which there is further provided means for limiting the output thereof provided in response to frequencies outside a selected band of frequencies having a center frequency corresponding to said selected frequency.

7. The device of claim 4 in which there is further provided amplitude-output signal limiting means comprising a first and second oppositely poled diode connected across said output and common input-output terminals, and a resistive impedance connected across said input and common output terminals of said frequency discriminator means.

8. Non-sweeping automatic electronic frequency control means employing a frequency discriminator comprising A bridge network having A first input terminal and second common input-output terminal, a shunt input resistor connector across said input terminals, A first and second bridge output terminal, A first capacitor connected across said first input and said first bridge output terminals and A first inductor connected across said first bridge output terminal and said common input-output terminal, and A second inductor connected across said first input terminal and said second bridge output terminal, A second capacitor connected across said second bridge output terminal and said common input-output terminal; and First and second output networks coupling said output terminal of said device to a respective one of said bridge output terminals, each said output network comprising A series-connected diode and resistor, said resistor connected to said output terminal and said diode being connected to said bridge terminal, A shunt capacitor connected across the common output terminal and the series interconnection of said diode and resistor, the diodes of said output networks being oppositely poled.

9. The device of claim 8 in which there is further provided signal limiting means, connected across the output thereof.

10. The device of claim 8 in which there is further provided a first and second oppositely poled diode connected across the output and common input-output terminals thereof.

11. The device of claim 8 in which there is further provided bi-polar integrating means comprising two series interconnected capacitors connected across a D.-C. voltage source, said interconnection of said capacitors forming an output terminal; and switching means having control terminals responsively coupled to the output terminal of said discriminator and arranged for discharging a selected one of said capacitors corresponding to a preselected polarity of a pulsed output of said discriminator.

12. Frequency discriminator means having an input, output and common input-output terminals, comprising A first and second series L-C network, each connected across said input and common terminals, the capacitive element of said first series network and the inductive element of said second network being commonly connected to said input terminal; and A first and second impedance network coupling the series interconnection of the inductor and capacitor elements of a respective one of said series L-C networks to said output terminal, each said impedance network comprising A diode connected to said series interconnection of said L-C network and a resistor connected to said output terminal, said diode and resistor being interconnected in series circuit, a shunt capacitor connected across said common input-output terminal and the interconnection of said diode and resistor.

13. The device of claim 12 in which there is further provided a shunt input resistor connected across said input and common input-output terminals.

14. In an automatic difference-frequency controller for a pulsed energy system having a radar transmitter of pulsed A.-C. energy, a local oscillator, an intermediate frequency receiver responsive to said transmitted energy and said local oscillator, and a microwave mixer responsive to both said pulsed A.-C. energy and the output of said local oscillator for providing an intermediate frequency signal, the combination comprising A frequency discriminator for providing a D.-C. signal having a sense corresponding to the frequency difference between said intermediate frequency signal and a selected reference frequency and comprising an L-C bridge responsive to said mixer, and summing means responsively coupled to said L-C and bridge having a first and second oppositely-poled unidirectionally conductive summing impedance branches;

Means for limiting the response of said discriminator to harmonics of said selected reference frequency and comprising a resistive impedance connected across the input of said L-C bridge and bi-polar signal limiting means coupled across the output of said signal summing means of said frequency discriminator; and Bi-polar pulse integrating means responsive to the limited output of said discriminator for providing a D.-C. control signal for frequency control of one of said local oscillator and radar transmitter, Whereby the frequency difference between said intermediate frequency signal and said frequency reference tends to be reduced.

15. In an automatic frequency controller for a pulsed energy system having a radar transmitter of pulsed A.-C. energy, a local oscillator, an intermediate frequency receiver response to said transmitted energy and said local oscillator, and a microwave mixer responsive to both said pulsed A.-C. energy and the output of said local oscillator for providing an intermediate frequency signal, the combination comprising A frequency discriminator for providing a D.-C. signal having a sense corresponding to the frequency difference between said intermediate frequency signal and a selected reference frequency and comprising an L-C bridge responsive to said mixer, and summing responsively coupled to said L-C bridge having first and second oppositely-poled unidirectionally conductive summing impedance branches;

Means for limiting the response of said discriminator to harmonics of said selected reference frequency and comprising a resistive impedance connected across the input of said L-C bridge and bi-polar signal limiting means coupled across the output of said signal summing means of said frequency discriminator; and Bi-polar pulse-integrating means responsive to the limited output of said discriminator for providing a D.-C. control signal for frequency control of one of said local oscillator and radar transmitter, and comprising an input terminal coupled to said discriminator, a first and second series-interconnected capacitor connected across a D.-C. voltage source, the interconnection of said capacitors forming an output terminal, a first and second mutually complementary switching means having control terminals commonly coupled to said input terminal, and arranged for discharging a selected one of said capacitors corresponding to a preselected polarity of a pulsed input applied to said input terminal.

16. In an automatic frequency controller for a pulsed energy system having a radar transmitter of pulsed A.-C. energy, a local oscillator, an intermediate frequency receiver response to said transmitted energy and said local oscillator, and a microwave mixer responsive to both said pulsed A.-C. energy and the output of said local oscillator for providing an intermediate frequency signal, the combination comprising:

A frequency discriminator for providing a D.-C. signal having a sense corresponding to the frequency difference between said intermediate frequency signal and a selected reference frequency and comprising an L-C bridge responsive to said mixer, and summing means responsively coupled to said L-C bridge having first and second oppositely-poled unidirectionally conductive summing impedance branches;

Means for limiting the response of said discriminator to harmonics of said selected reference frequency comprising a resistive impedance connected across the input of said L-C bridge; and Bi-polar pulse-integrating means for providing a D.-C. control signal for frequency control of one of said local oscillator and radar transmitter; and comprising Two series-interconnected capacitors connected across a D.-C. voltage source, the interconnection of said capacitors forming an output terminal, and switching means having control terminals responsively coupled to the output of said discriminator and arranged for discharging a selected one of said capacitors corresponding to a preselected polarity of a pulsed output of said discriminator, Whereby the frequency difference between said intermediate frequency and said frequency reference tends to be reduced.

References Cited by the Examiner

UNITED STATES PATENTS

| | | | |
|---|---|---|---|
| 3,047,813 | 7/1962 | Danker | 329—103 |
| 3,054,104 | 9/1962 | Wright | 343—14 |

CHESTER L. JUSTUS, *Primary Examiner.*

R. D. BENNETT, *Assistant Examiner.*